United States Patent
Pettey (10) Patent No.: US 11,009,053 B2
(45) Date of Patent: May 18, 2021

(54) CLAMPING HUB

(71) Applicant: ROBOTZONE, LLC, Winfield, KS (US)

(72) Inventor: Brian T. Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 322 days.

(21) Appl. No.: 15/785,924

(22) Filed: Oct. 17, 2017

(65) Prior Publication Data
US 2018/0112691 A1   Apr. 26, 2018

Related U.S. Application Data (60) Provisional application No. 62/411,228, filed on Oct. 21, 2016.

(51) Int. Cl.
| | | |
|---|---|---|
| F16B 2/06 | (2006.01) | |
| F16D 1/08 | (2006.01) | |
| F16D 1/10 | (2006.01) | |

(52) U.S. Cl.
CPC ............ *F16B 2/065* (2013.01); *F16D 1/0847* (2013.01); *F16D 1/0864* (2013.01); *F16D 2001/102* (2013.01); *Y10T 403/535* (2015.01)

(58) Field of Classification Search
CPC ................ F16D 1/0847; F16D 1/0864; F16D 2001/102; F16B 2/065; Y10T 403/7041; Y10T 403/535
See application file for complete search history.

(56) References Cited

U.S. PATENT DOCUMENTS

| | | | |
|---|---|---|---|
| 1,166,688 A | 1/1916 | Hornby | |
| 1,763,302 A | 6/1930 | Gilbert | |
| 1,789,896 A | 1/1931 | Gilbert | |
| 1,792,976 A | 2/1931 | Gilbert | |
| 2,082,138 A | 6/1937 | Badel | |
| 2,095,700 A | 10/1937 | Heede | |
| 2,124,748 A * | 7/1938 | Ransom, Jr. | A47L 15/0068 15/164 |
| 2,269,821 A * | 1/1942 | Kemphert | F16D 1/096 474/170 |
| 2,306,876 A * | 12/1942 | Gits | G05G 1/12 403/362 |
| 2,466,097 A * | 4/1949 | Graue | F16D 1/0876 403/356 |
| 2,804,322 A * | 8/1957 | Herzog | F16H 57/0025 156/293 |
| 2,933,934 A * | 4/1960 | Haroldson | F16H 55/36 474/180 |
| 3,355,837 A | 12/1967 | Pedersen | |

(Continued)

OTHER PUBLICATIONS https://www.superdroidrobots.com/shop/item.aspx/steel-d-shaft-sprocket-for-25-pitch-chain-15-teeth/2209, Apr. 15, 2019, 2 pages.

*Primary Examiner* — Matthew R McMahon
(74) *Attorney, Agent, or Firm* — Wesley W. Malherek; Kelly, Holt & Christenson PLLC (57) ABSTRACT

Embodiments of clamping hub are disclosed. In one embodiment, the clamping hub includes a non-circular aperture with a portion of the non-circular aperture being formed so as to be substantially flat. The clamping hub also includes a shaft securer aperture that is formed in a substantially flat wall that contributes to the substantially flat portion of the non-circular aperture.

17 Claims, 12 Drawing Sheets

(56) References Cited

U.S. PATENT DOCUMENTS

| | | | | |
|---|---|---|---|---|
| 3,598,432 | A * | 8/1971 | Walker | F16D 1/0847 403/366 |
| 3,708,243 | A * | 1/1973 | Wooden | F04D 29/20 416/134 R |
| 3,937,595 | A * | 2/1976 | English | F04D 29/263 416/244 R |
| 4,006,993 | A * | 2/1977 | Woerlee | F16D 1/06 403/359.5 |
| 4,067,658 | A * | 1/1978 | Ueno | G05G 1/12 403/357 |
| 4,142,811 | A * | 3/1979 | Burnham | F16D 1/0864 403/290 |
| 4,274,036 | A | 6/1981 | Fukasaku et al. | |
| 4,475,475 | A * | 10/1984 | Zylbert | D05B 59/00 112/228 |
| 4,848,951 | A * | 7/1989 | Boogerman | F16D 1/0864 403/24 |
| 4,884,834 | A * | 12/1989 | Ozagir | E05B 1/0015 292/350 |
| 4,984,931 | A * | 1/1991 | Struthers | G05G 1/12 403/356 |
| 5,052,842 | A * | 10/1991 | Janatka | F16D 1/072 403/14 |
| 5,062,734 | A * | 11/1991 | Vanzee | F16D 1/0864 403/313 |
| 5,067,845 | A * | 11/1991 | Schlueter | F16B 2/065 403/344 |
| 5,306,096 | A * | 4/1994 | Tuns | F16D 1/0864 403/290 |
| 5,580,184 | A * | 12/1996 | Riccitelli | F16D 1/0864 280/779 |
| 5,851,084 | A * | 12/1998 | Nishikawa | F16D 1/0864 403/344 |
| 6,364,720 | B1 * | 4/2002 | Liang | H01R 11/281 439/462 |
| 6,390,721 | B1 * | 5/2002 | Wilson, II | F16B 7/0486 403/234 |
| 6,619,878 | B2 * | 9/2003 | Wang | F16B 2/18 403/374.3 |
| 6,682,432 | B1 * | 1/2004 | Shinozuka | F16B 2/065 464/78 |
| 6,905,249 | B2 * | 6/2005 | Schill | F16C 35/073 384/541 |
| 97,243,662 | | 7/2007 | Enright | |
| 7,284,457 | B2 | 10/2007 | Jinno et al. | |
| 7,431,531 | B2 * | 10/2008 | Carnevali | B25G 3/26 403/328 |
| 7,524,132 | B2 * | 4/2009 | Horen | F16D 1/108 403/354 |
| 7,930,826 | B2 * | 4/2011 | Inoue | B21K 1/12 29/557 |
| 8,453,987 | B2 * | 6/2013 | Pettey | A63H 29/22 248/122.1 |
| 8,816,553 | B2 * | 8/2014 | Pettey | F16C 35/045 310/91 |
| 9,038,621 | B2 * | 5/2015 | Cadima | F24C 3/12 126/39 E |
| 9,181,985 | B2 * | 11/2015 | Carlson | F16D 1/0864 |
| 9,291,205 | B2 * | 3/2016 | Widenmeyer | F16D 1/0847 |
| 9,650,130 | B2 | 1/2017 | Pettey | |
| 9,581,205 | B2 * | 2/2017 | Knoth | F16D 1/0864 |
| D827,573 | S * | 9/2018 | Pettey | D13/120 |
| 10,125,854 | B2 * | 11/2018 | Lingren | F16H 48/28 |
| 10,215,264 | B2 * | 2/2019 | Ungar | F16H 25/2015 |
| 2009/0247045 | A1 * | 10/2009 | Pettey | A63H 33/042 446/484 |
| 2015/0016878 | A1 * | 1/2015 | Isaacson | B62D 1/10 403/327 |
| 2016/0160929 | A1 * | 6/2016 | Janatka | F16D 1/0858 403/14 |
| 2019/0154085 | A1 * | 5/2019 | Watanabe | F16D 1/0847 |

\* cited by examiner

CLAMPING HUB

CROSS-REFERENCE TO RELATED APPLICATION

The present application is based on and claims the benefit of U.S. provisional patent application Ser. No. 62/411,228, filed Oct. 21, 2016, the content of which is hereby incorporated by reference in its entirety.

BACKGROUND

Hobby robotics is a growing industry. In this industry, it is common to use various structural and motion components to build a project. Structural components can include channels, extrusions, beans, brackets, blocks, hubs, etc. Motion components can include stepper or servo motors, linear actuators, shafts, devises, gears, etc.

SUMMARY

Embodiments of a clamping hub are disclosed. In one embodiment, the clamping hub includes a non-circular aperture with a portion of the non-circular aperture being formed so as to be substantially flat. The clamping hub also includes a shaft securer aperture that is formed in a substantially flat wall that contributes to the substantially flat portion of the non-circular aperture.

DETAILED DESCRIPTION OF ILLUSTRATIVE EMBODIMENTS

Figure 1A:
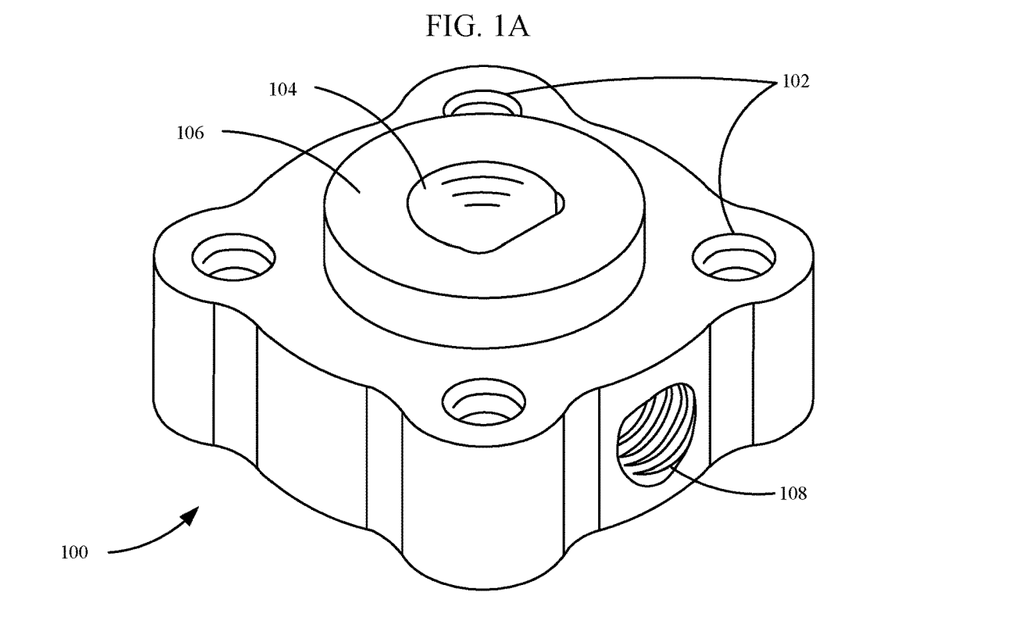
FIGS. 1A and B illustrate a top and bottom view of one example of an attachment hub, in accordance with embodiments of the present invention.

FIG. 1A illustrates a top view of one example of an attachment hub, in accordance with an embodiment of the present invention. Hub 100 comprises an accessory receiver 102, a shaft receiver 104, an alignment extrusion 106 and a shaft securer 108. As shown, there are four accessory receivers 102. In another example, hub 100 comprises a different number of accessory receivers 102. Accessory receivers 102 receives fasteners that secure an accessory (not shown). In one example, accessory receivers 102 are threaded apertures. The accessory can be aligned on the hub with the assistance of alignment extrusion 106.

Shaft receiver 104 receives a shaft. As shown, the shaft receiver 104 is in a "D" shape, however shaft receiver 104 can be another shape to accommodate a differently shaped shaft. In one example, shaft receiver 104 can be the same shape as the cross-section of a received shaft. Shaft securer 108 is a threaded aperture that receives a fastener that can be tightened on to the shaft, which in turn, secures the hub on to the shaft. Commonly, a set screw is used as a fastener for shaft securer 108. One disadvantage of the fastener type shaft securer 108 is that the fastener, when tightened, can damage the shaft. To minimize the effect of this damage shaft securer 108 is aligned with the flat portion of shaft receiver 104. This way if there's any damage on a received shaft it is on the flat portion of the shaft. Therefore, if the shaft is later inserted into a round aperture the damage, should not interfere with this insertion. Shaft securer 108 in another example, aligns with the opposite side of the flat portion of shaft receiver 104. In this example, tightening a thread aperture would force a flat portion of a shaft against the flat portion of shaft receiver 104.

Figure 1B:
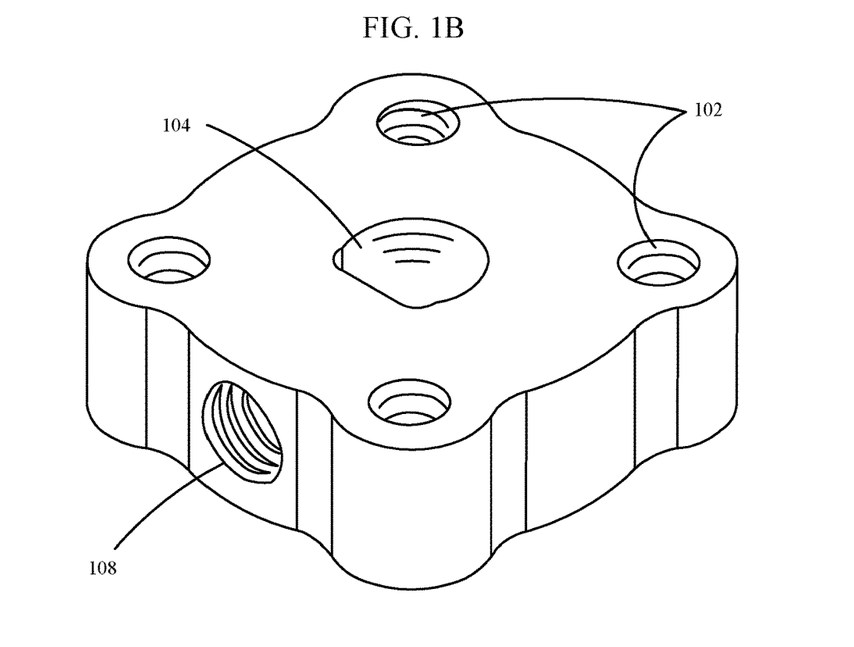

FIG. 1B illustrates a bottom view of hub 100, in accordance with an embodiment of the present invention. As shown hub 100 comprises accessory receivers 102. In the shown example, these accessory receivers 102 are through hole apertures. In another example, accessory receivers 102 are blind hole apertures and do not extend fully through the hub. Similarly, shaft receiver 104, as shown, comprises a through hole aperture. In another example, the aperture of shaft receiver 102 is a blind hole and does not extend fully through the hub.

Figure 2A:
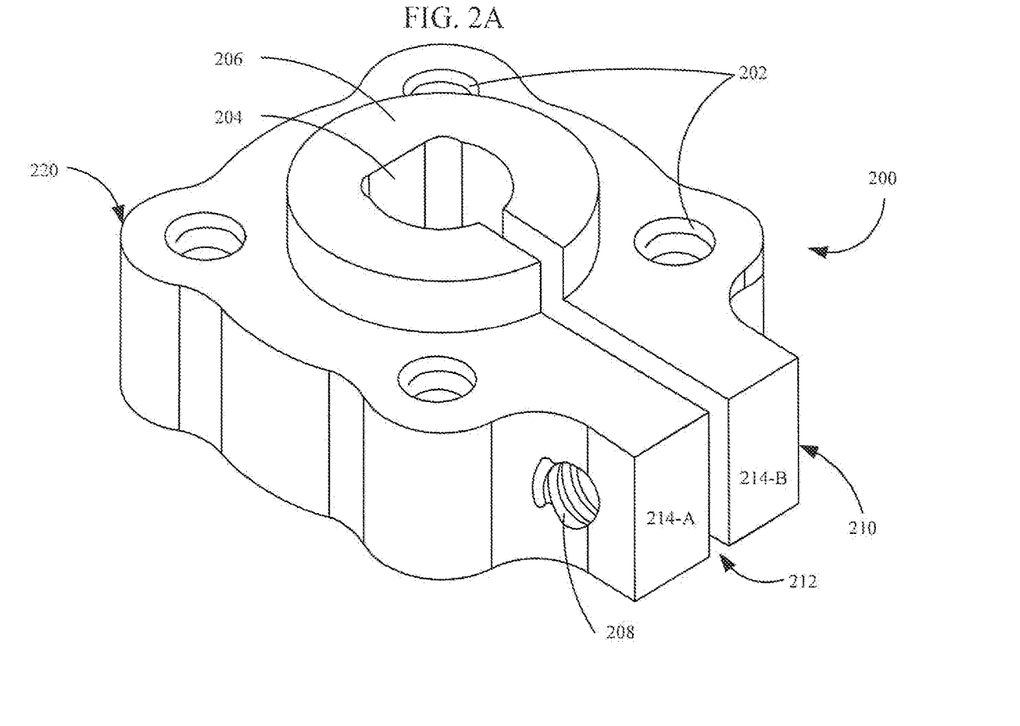
FIGS. 2A and 2B illustrate a top and bottom view of one example of a clamping hub, in accordance with embodiments of the present invention.

FIG. 2A illustrates a top view of clamping hub 200, in accordance with an embodiment of the present invention. Hub 200, as shown, comprises a body 220, an accessory receiver 202, a shaft receiver 204, an alignment extrusion 206 and a shaft securer 210. Accessory receiver 202, in one example, comprises one or more apertures or other components use to secure an accessory to hub 200. The accessory, in one example, can be aligned with alignment extrusion 206. Shaft receiver 204 receives a shaft. The hub can be secured onto the shaft by shaft securer 210.

Shaft securer 210, as shown, comprises a gap 212, a threaded aperture 208, a clearance aperture and flanges 214-A and 214-B. Gap 212 can be tightened by a fastener inserted through clearance aperture 209 and threaded onto threaded aperture 208. By tightening the fastener, flanges 214-A and 214-B are driven closer together, reducing the size of gap 212. Closing gap 212 also constricts shaft receiver 204 on to a received shaft.

Figure 2B:
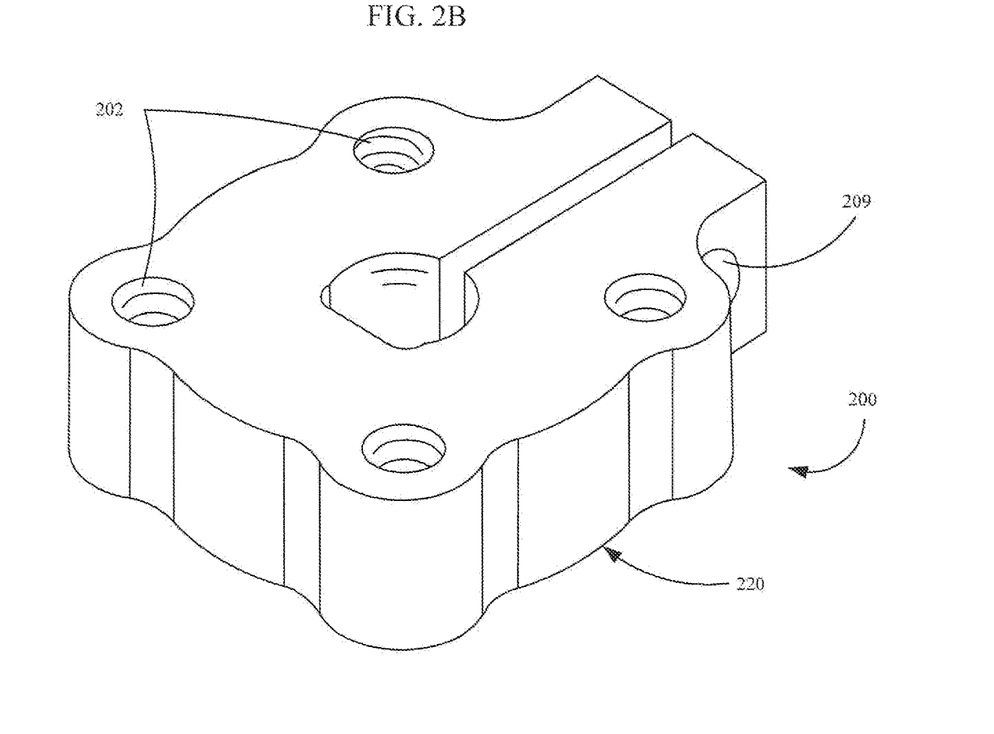

FIG. 2B illustrates a bottom view of hub 200, in accordance with an embodiment of the present invention. As shown, hub 200 comprises the clearance aperture 209. In another example, clearance aperture 209 and threaded aperture 208 are located on opposite flanges.

In one example, clearance aperture 209 and threaded aperture 208 do not comprise threads such that closing gap 212 is accomplished by fasteners inserted through clearance aperture 209 and threaded aperture 208. In one example, a nut, bolt and washer combination are used to fasten clearance aperture 209 and threaded aperture 208. As shown, hub 200 comprises accessory receivers 202. In one example, accessory receivers 202 are through hole apertures. In another example, accessory receivers 202 are blind hole apertures that do not extend fully through the hub. The spacing between apertures 202 may correspond to an accessory that is to be attached to hub 200. In one example, apertures 202 are substantially in a 1.5"×1.5" from center square orientation. In one example, apertures 202 are substantially in a 0.544"×0.544" (0.770" diagonal) from center square orientation. Another example, apertures 202 are substantially in a 16 mm by 16 mm square pattern. In one example, apertures 202 are 6-32 threaded apertures. In another example, apertures 202 are M4 threaded apertures.

In the shown example, shaft securer 210 is located on the opposite side of a flat portion of shaft receiver 204. This location may provide the advantage that as shaft securer 210 is tightened a flat portion of a received shaft is forced against the flat portion of shaft receiver 204.

In one example, hub 200 also comprises an additional shaft securer (not shown in FIGS. 2A-B) similar to the shaft securer 108 in FIGS. 1A and 1B. This may be beneficial where a shaft has a circular cross-section which is prone to slipping. Having multiple shaft securers may ensure that hub 200 does not slip on the shaft.

Figure 3A:
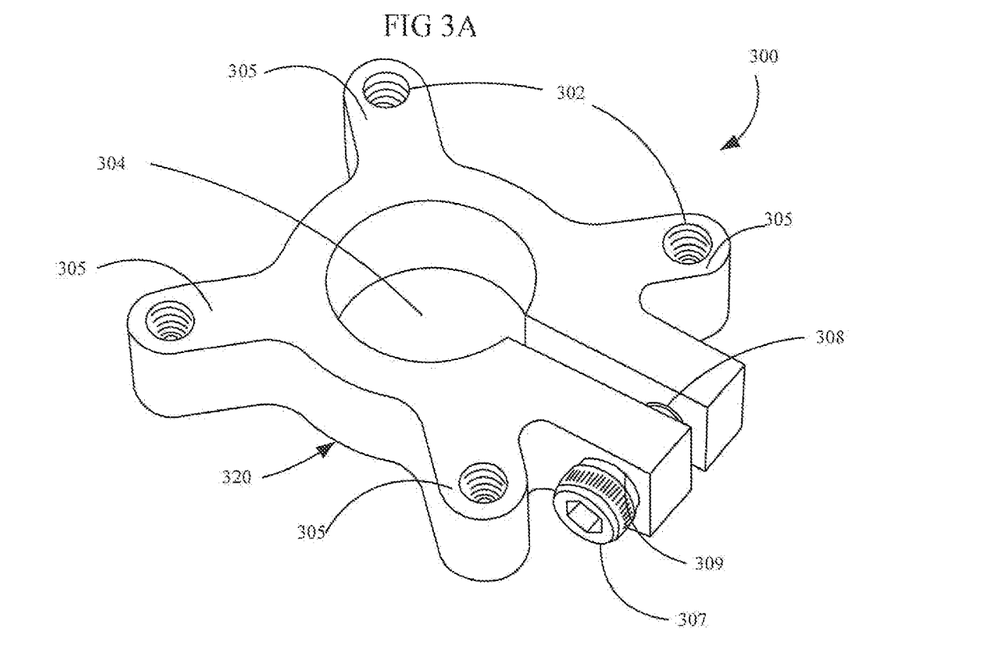
FIG. 3A-3F illustrate examples of different clamping hubs, in accordance with embodiments of the present invention.

FIGS. 3A-3E illustrate other examples of clamping hubs, in accordance with embodiments of the present invention. FIG. 3A illustrates one example of a wide-span profile clamping hub. Hub 300 comprises an accessory receiver 302, a shaft receiver 304, a fastener 307, a threaded aperture 308 and a clearance aperture 309. As shown, accessory receivers 302 are located on body protrusions 305. Body protrusions 305 can, in one example, allow hub 300 to be coupled to a larger accessory while reducing the volume/weight of hub 300.

Figure 3B:
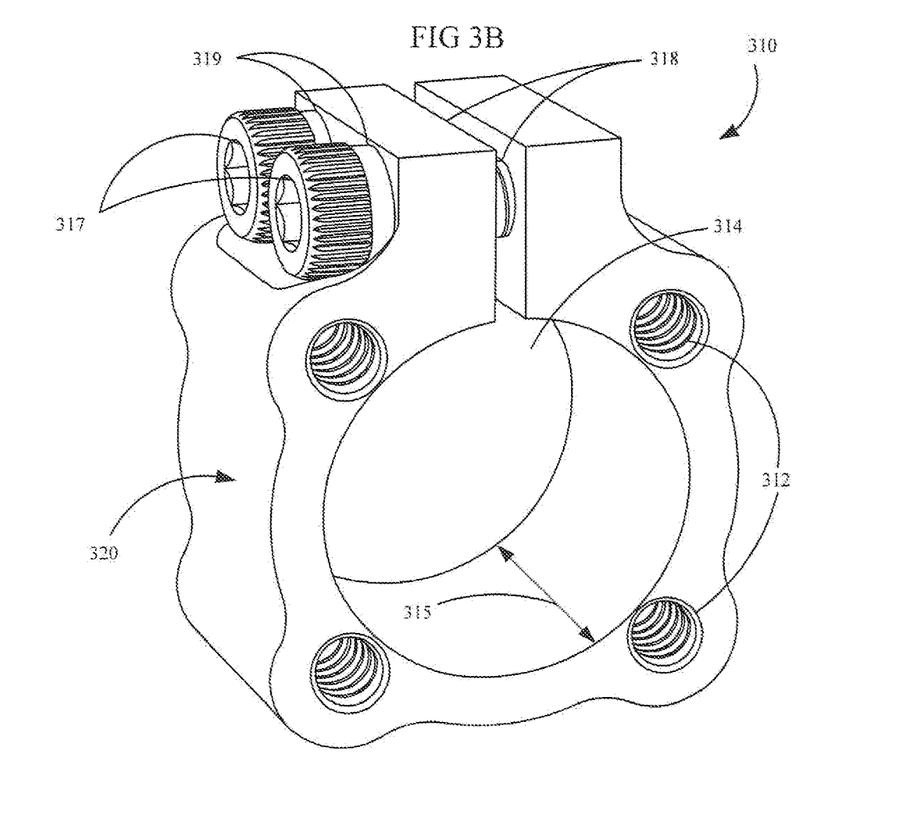

FIG. 3B illustrates one example of a deep clamping hub, in accordance with an embodiment of the present invention. Hub 310 comprises accessory receivers 312, a shaft receiver 314, fasteners 317, threaded apertures 318 and clearance apertures 319. As shown, there are two fasteners 317. However, in another example, there are more than 2 fasteners 317. Having multiple fasteners 317 allow for a greater clamping force on the shaft that is received by shaft receiver 314. Also shown is a hub depth 315. Greater hub depth 315 allows for more surface area in contact between the shaft and shaft receiver 314. In one example, hub depth 315 is substantially 0.5 inch. In one example, hub depth 315 is substantially 0.275 inch. In one example, hub depth 315 is substantially 0.375 inch. In one example, hub depth 315 is substantially 0.375 inch.

Figure 3C:
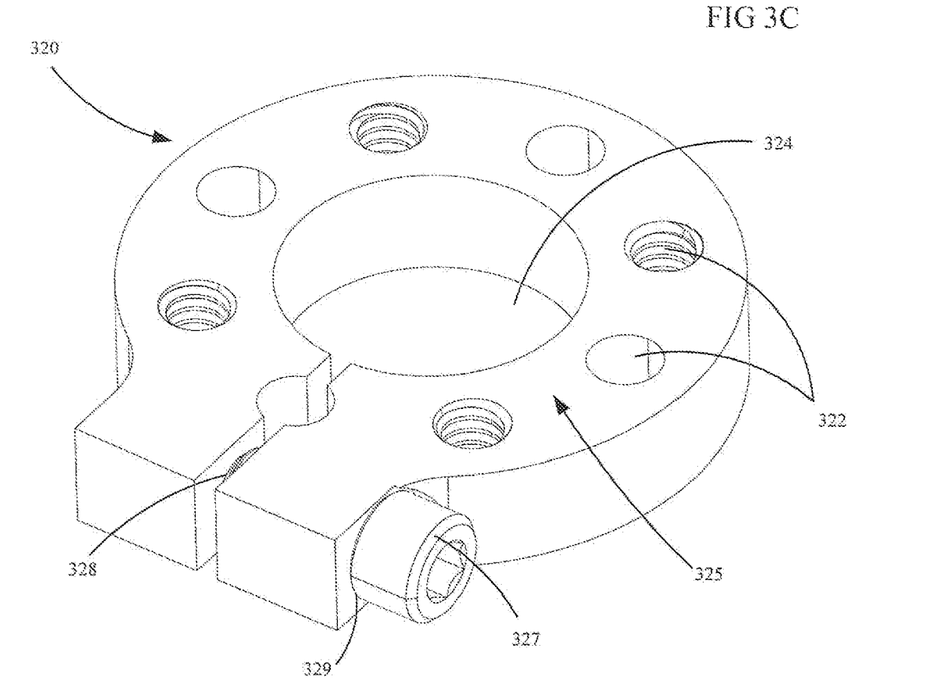

FIG. 3C illustrates one example of a heavy-duty profile clamping hub, in accordance with an embodiment of the present invention. Hub 320 comprises accessory receivers 322, a shaft receiver 324, a threaded aperture 328, a clearance aperture 329 and a fastener 327. As shown, accessory receivers 322 can be located within a round hub body 325, as opposed to being located on a protrusion from the body, as shown in the example of MG. 3A. Being located within the body can reduce flexing of the body protrusions, and thus reduce any moving of the accessory receivers 322.

Figure 3D:
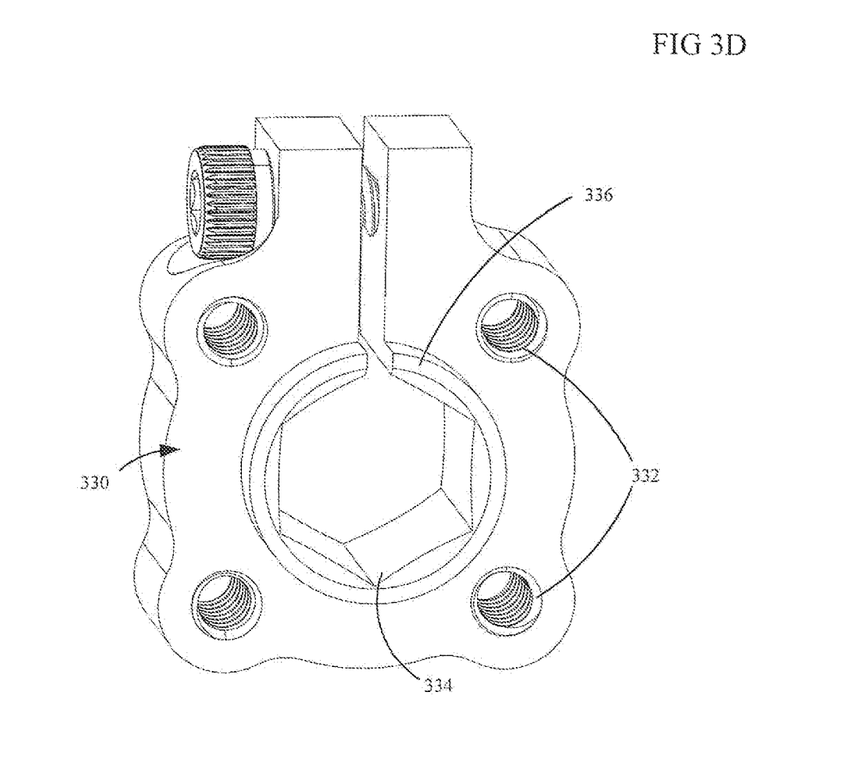

FIG. 3D illustrates one example of a hexagonal profile clamping hub, in accordance with an embodiment of the present invention. Hub 330 comprises accessory receivers 332, a shaft receiver 334 and a body extrusion 336. As shown shaft receiver 334 is a hexagonal aperture. In other examples, shaft receiver 334 can be another shaped aperture, e.g. "D" shaped, square, etc. Having a noncircular shape helps to prevent any slipping of a shaft received by shaft receiver 334. Body extrusion 336, as shown, extrudes outward from hub 320 on only one side. In another example, body extrusion 336 extrudes outward from hub 320 on both sides. Body extrusion 336 can increase the surface area between shaft and shaft receiver 334. Body extrusion 336 can also align an accessory mounted to hub 320. In one example, body extrusion 336 extrudes substantially 0.1" away from hub 320.

Figure 3E:
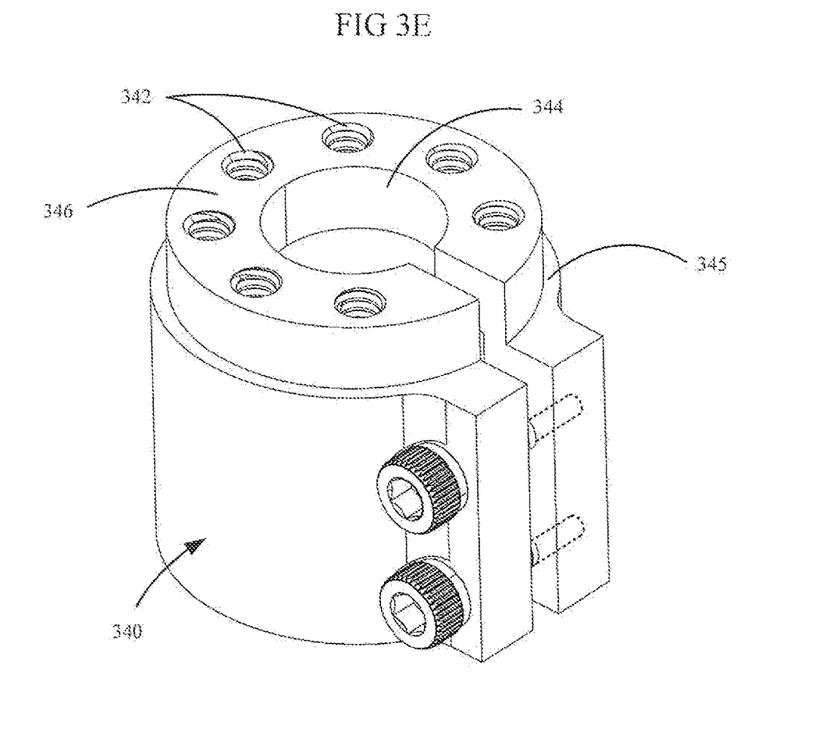

FIG. 3E illustrates one example of a deep heavy-duty profile clamping hub, in accordance with an embodiment of the present invention. Hub 340 comprises accessory receivers 342, a shaft receiver 344, an extrusion 346 and a lip 345. As shown, hub 340 has a lip 345 that extends radially inward on shaft receiver 344. Lip 345 can prevent a shaft inserted into shaft receiver 344 from extending completely through hub 340 or in preventing the hub 340 from slipping too far on the shaft.

Figure 3F:
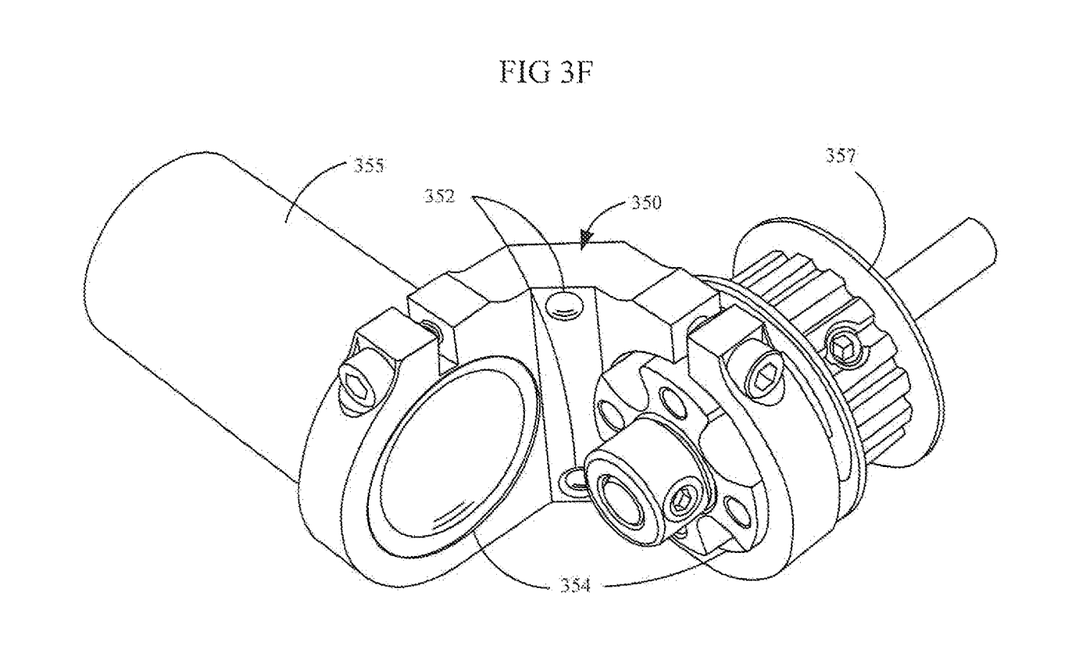

FIG. 3F illustrates one example of a dual corner clamping hub, in accordance with an embodiment of the present invention. Hub 350 comprises accessory receivers 352 and shaft receivers 354. As shown, hub 350 does not have a flat profile but rather a beveled corner profile. Hub 350 also has multiple shaft receivers 354, in one example, each accepting its own shaft (e.g. shafts 355 and 357). Shafts 355, 357 are a pipe and a bearing hub respectively.

Figure 4A:
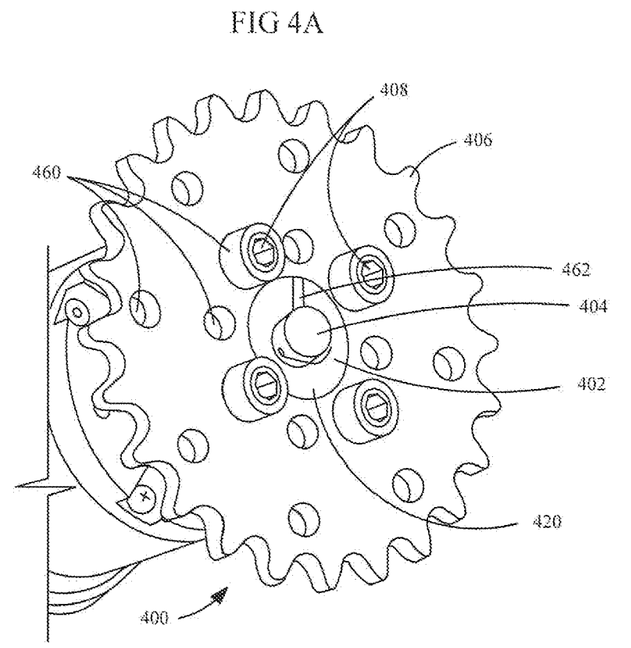
FIG. 4A-B illustrate a front and rear view of one example of an attachment assembly, in accordance with embodiments of the present invention.

FIG. 4A illustrates a front view of one example of an attachment assembly, in accordance with an embodiment of the present invention. Assembly 400, in one example comprises hub 402, shaft 404, accessory 406, and fasteners 408. Hub 402 is secured onto shaft 404. As shown, accessory 406 is a sprocket. However, other suitable accessories are also possible, including, but not limited to, those shown in FIGS. 5A-F. Accessory 406 is secured to hub 402 by fasteners 408. As shown, fasteners 408 are socket cap screws. In another example, fasteners 408 could be another type of fastener, for example, any of, rivets, machine screws, bolts, nuts, weld, etc. Fasteners 408, in one example are inserted through mounting apertures 460 of the accessory 406. As shown, there are four fasteners 408, however, in other examples there may be a different number of fasteners 408. As shown, there are plurality of mounting apertures 460 where hub 402 can be secured. In another example, there is only one set of mounting apertures 460 corresponding to the apertures on the hub. Accessory 406, in one example, is centered on hub 402 by aligning aperture 462 of accessory 406 contacting aligning extrusion 420 of hub 402. As shown, aligning aperture 462 and aligning extrusion 420 have a circular cross-section, however, the cross-section may be a different non-circular shape.

Figure 4B:
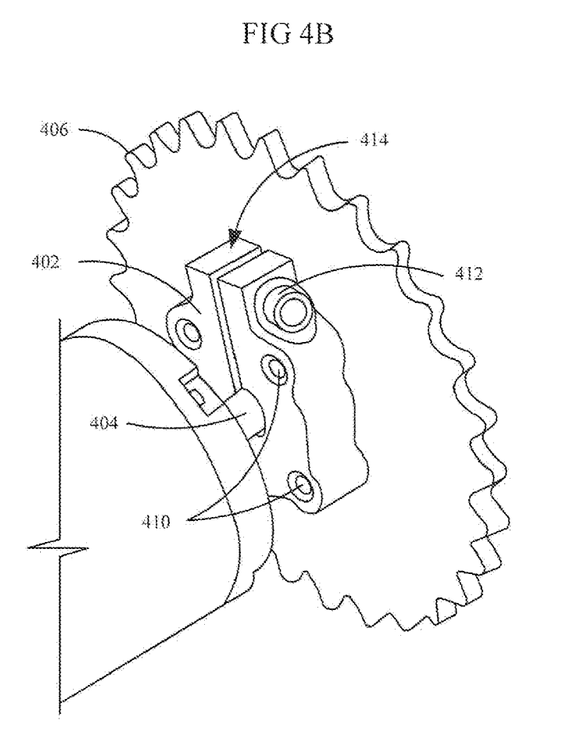

FIG. 4B illustrates a rear view of one example of an attachment assembly, in accordance with an embodiment of the present invention. Hub 402 and accessory 406 are coupled together by fasteners 408 being threaded into apertures of accessory receiver 410. In other examples, hub 402 and accessory 406 are coupled together in a different way. Hub 402 is coupled to shaft 404 through clamp 414 and fastener 412.

Figure 5A:
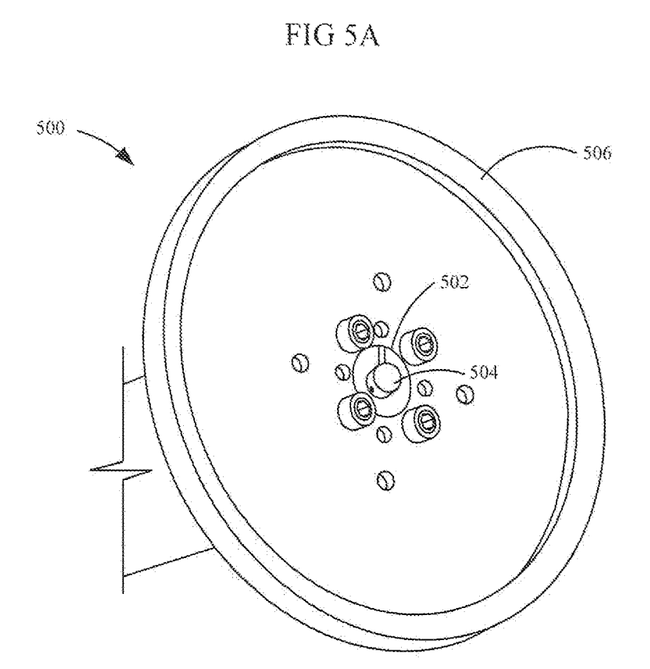
FIG. 5A-F illustrate examples of a different attachment assemblies, in accordance with embodiments of the present invention.
Figure 5B:
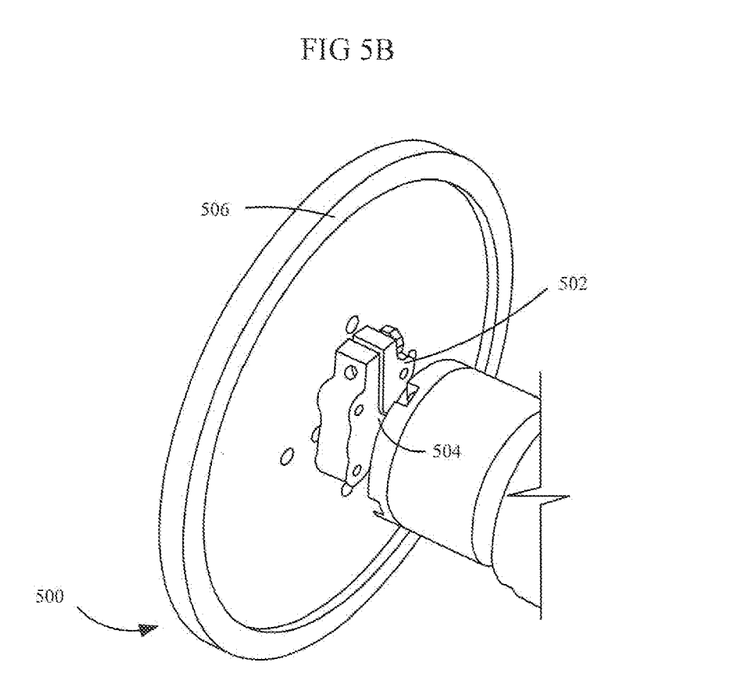

FIGS. 5A and 5B illustrate views of one example of an attachment assembly, in accordance with embodiments of the present invention. Hub assembly 500 comprises hub 502, accessory 506 and shaft 504. As shown, accessory 506 is a wheel and, in one example, couples similarly to accessory 406 and hub 402.

Figure 5C:
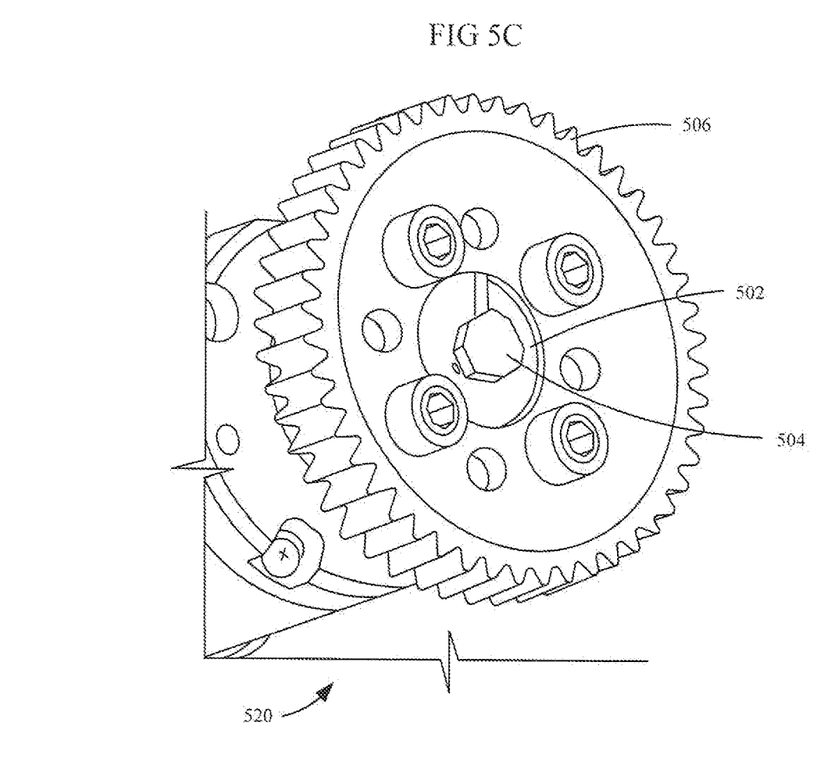
Figure 5D:
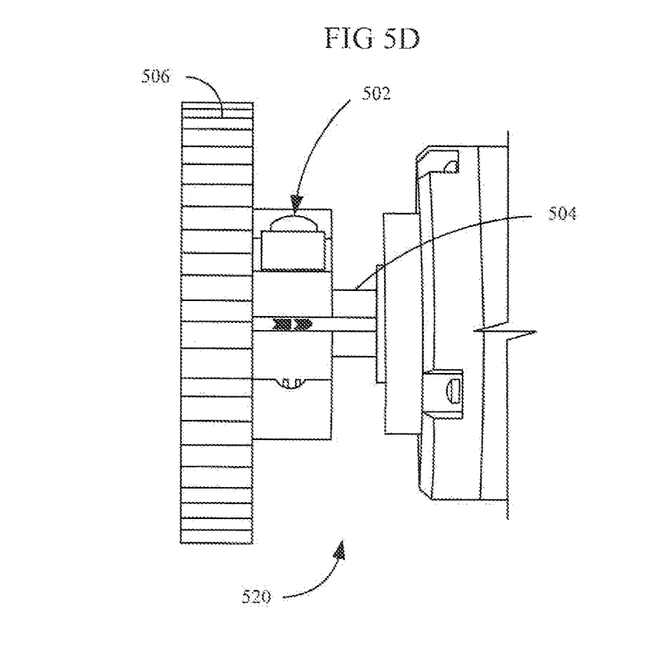

FIGS. 5C and 5D illustrate views of one example of an attachment assembly, in accordance with embodiments of the present invention. Hub assembly 520 comprises hub 502, accessory 506 and shaft 504. As shown, accessory 506 is a gear and, in one example, couples similarly to accessory 406 and hub 402.

Figure 5E:
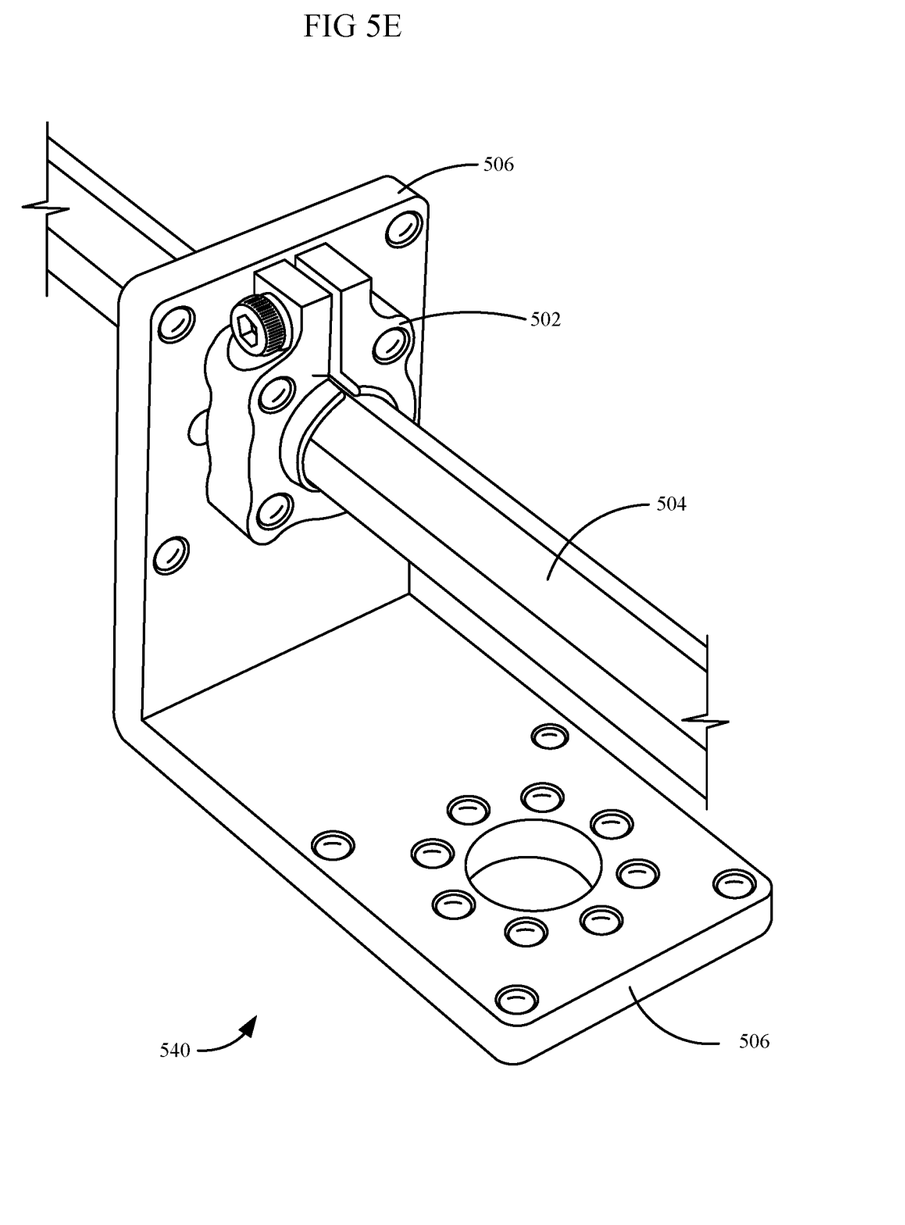

FIG. 5E illustrates a view of one example of an attachment assembly, in accordance with an embodiment of the present invention. Hub assembly 540 comprises hub 502, accessory 506 and shaft 504. As shown, accessory 506 is a bracket and, in one example, couples similarly to accessory 406 and hub 402.

Figure 5F:
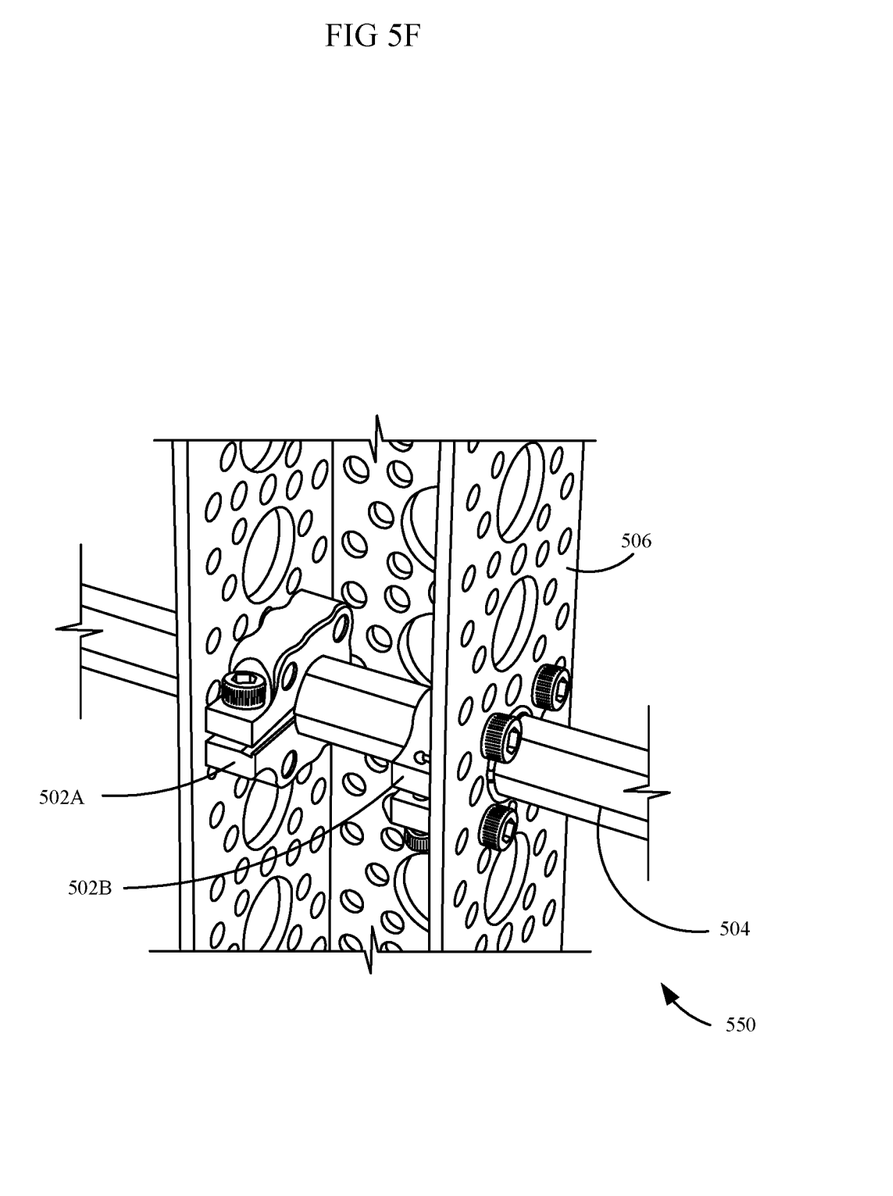

FIG. 5F illustrates a view of one example of an attachment assembly, in accordance with an embodiment of the present invention. Hub assembly 550 comprises hub 502A, hub 502B, accessory 506 and shaft 504. As shown, accessory 506 is an arm and, in one example, couples similarly to accessory 406 and hub 402.

Figure 6:
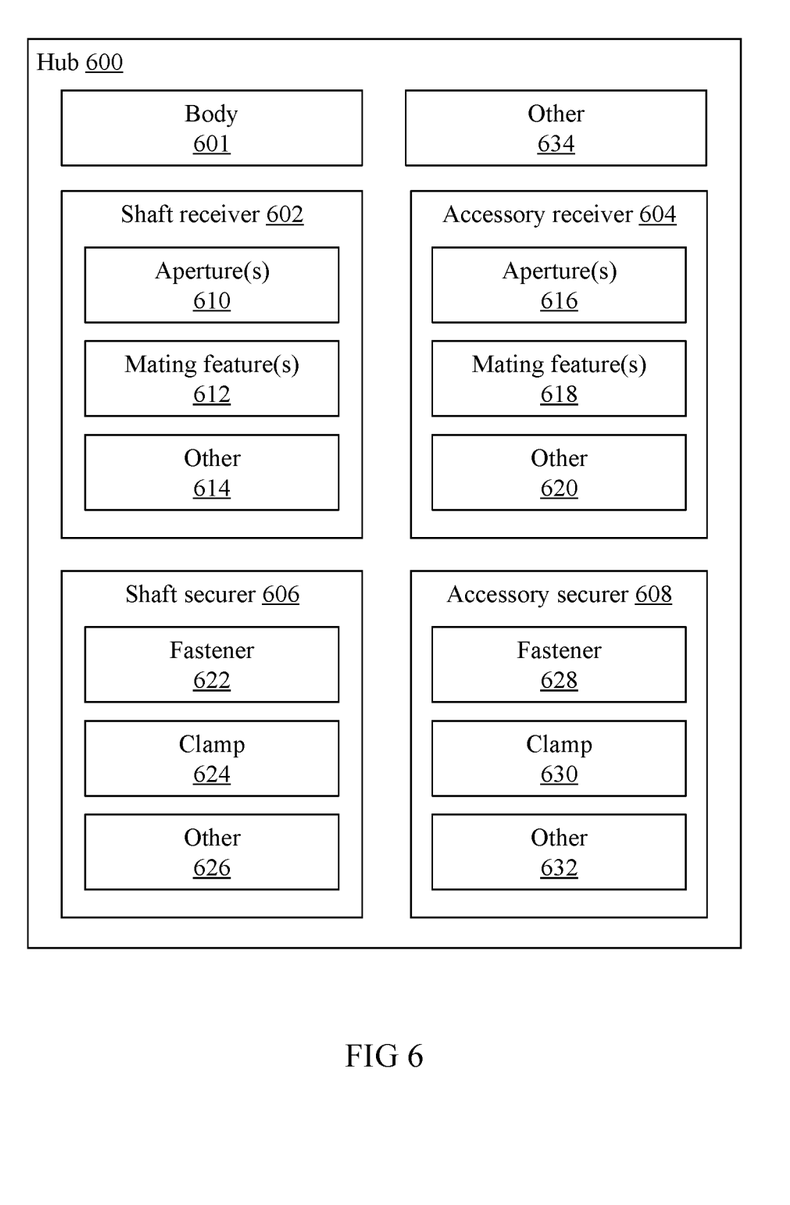
FIG. 6 illustrates a block diagram of one example of an attachment hub, in accordance with an embodiment of the present invention.

FIG. 6 illustrates a block diagram of one example of an attachment hub, in accordance with an embodiment of the present invention. Hub 600 comprises a shaft coupler 602, an accessory coupler 604 and a body 606. Hub 600 may also comprise other components as indicated by block 607. Shaft coupler 602 comprises clamp 608 and bore 610. Shaft coupler 602 may also comprise other components as indicated by block 612. Clamp 608 is configured to secure a shaft, pipe or other accessory inserted into bore 610. In one example, clamp 608 comprises fasteners 609, a threaded aperture 611, a clearance aperture 613 and a gap 615. However, clamp 608 can comprise any other components as indicated by block 617. In one example, fastener 609 is inserted through its respective clearance aperture 613 and comes into a threaded connection with a threaded aperture 611 to reduce the size of gap 615. In one example, fastener 609 is a 6-32 machine screws with a socket hex cap head. In another example, fastener 609 is a M4 machine screw with a socket hex cap head.

Bore 610 can be shaped to accommodate different shafts as indicated by block 614. Some examples of suitable shapes include a circle, keyed circle, semi-circle, D shape or hexagon, as well as any other suitable shape. Bore 610 may also comprise an extrusion, as indicated by block 616. An extrusion can increase the contact surface area between the bore 610 and an inserted shaft. An extrusion can also be shaped to aid in alignment of an accessory or shaft. Bore 610 may also be sized to fit different size shafts, as indicated by block 618. In one example, bore 610 is substantially 1 inch in diameter. In one example, bore 610 is substantially 15 mm in diameter. In one example, bore 610 is substantially 21 mm in diameter. In one example, bore 610 is substantially 22 mm in diameter. In one example, bore 610 is substantially 25 mm. In one example, bore 610 is substantially 1.5 inch in diameter. However, bore 610 may be any other suitable size in diameter, depending on the application. Bore 610 may also comprise other components as indicated by block 620.

Accessory coupler 604, in one example, is configured to secure in accessory to hub 600. Accessory coupler 604 can comprise threaded apertures that receive fasteners from an accessory as indicated by block 622. Accessory coupler 604 can also comprise through holes that receive fasteners from accessory as indicated by block 624. Using through holes may require fasteners on both sides of accessory coupler 604. Accessory coupler 604 may also couple accessory to hub 600 using in another connection mechanism as indicated by block 626.

Hub 600 also comprises body 606. Body 606 can comprise aluminum as indicated by block 628. Body 606 can also comprise plastic as indicated by block 630. Body 606 can also be comprise any other suitable material. Body 606 can be sized for different applications, as indicated by block 632. For example, body 606 can be larger or smaller depending on the shaft and accessory that is coupled to hub 600. Body 606 can also be shaped for different applications, as indicated by block 634. For example, body 606 may require a special shape to allow for hub balancing in high rotation applications.

Figure 7:
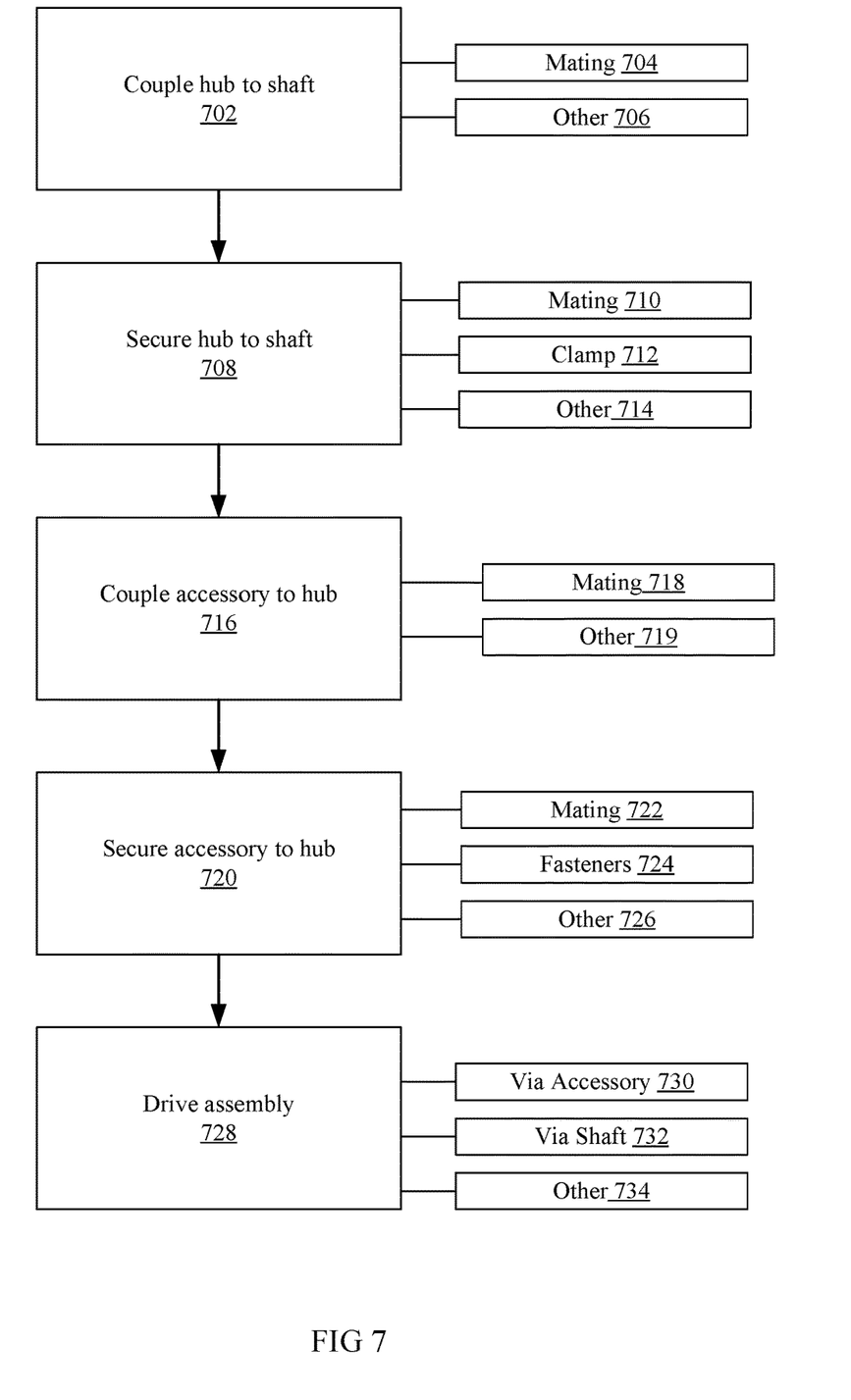
FIG. 7 illustrates one example of a method of operation, in accordance with an embodiment of the present invention.

FIG. 7 illustrates one example of a method of operation, in accordance with an embodiment of the present invention. Method 700 can be useful for driving a hub assembly.

At block 702, the hub is coupled onto the shaft. The hub may comprise features that correspond and mate with features on the shaft, as indicated by block 704. An example of a mated feature may include a flat (d-shaft) or protruding features (teethed shaft) on the shaft. The hub may also fit loosely or otherwise on the shaft, as indicated by block 706.

At block 708, the hub is secured onto the shaft. Securing the hub may involve mating of features of the hub and shaft, as indicated by block 710. Securing the hub may involve a clamp force, as indicated by block 712. A clamp force can be applied through one or more threaded connections. A clamp force may also be applied through a locking lever mechanism. Securing the hub may also involve other mechanisms, as indicated by block 714.

At block 716, an accessory is coupled to the hub. The accessory can have a feature that mates with the hub, as indicated by block 718. For example, the accessory has a hexagonal aperture that corresponds and mates with a hexagonal extrusion of the hub. As another example, the accessory may have a non-symmetrical aperture that corresponds with an extrusion of the hub. A non-symmetrical shape would ensure that the accessory was coupled to the hub in a specific orientation. The accessory may also fit loosely or otherwise on the hub, as indicated by block 719.

At block 720, the accessory is secured to the hub. Securing the accessory may involve mating of features on the accessory and hub, as indicated by block 722. Securing the accessory may involve tightening of fasteners, as indicated by block 724. Examples of some fasteners are socket cap screws, machine screws, bolts, rivets, pins, etc. Securing the accessory may involve other mechanisms as well, as indicated by block 726.

At block 728, the assembly is driven. The assembly may be driven via the accessory as indicated by block 730. For example, the assembly can be driven via the accessory when the shaft is not a drive shaft and the accessory is a gear/pulley/sprocket/etc. driven by motor. The assembly may be driven via the shaft, as indicated by block 732. For example, the shaft is a shaft of a servo motor. Driving the assembly can also be completed via other means as well, as indicated by block 734.

Examples of the present invention provide many improvements and features not currently in use. One of these features includes the location of the set screw aperture on a D-shaped bore hub. Another one of these features includes the clamp gap location on a D shaped bore hub. Another new feature is the aperture 0.770" diagonal and 16 mm×16 mm patterns. Another new feature is the sizing of the apertures to mate with or be threaded to match standard components. Additionally, there are other new features disclosed herein not found in any past disclosures.

Although the present invent some ion has been described with reference to preferred embodiments, workers skilled in the art will recognize that changes may be made in form and detail without departing from the spirit and scope of the invention.

What is claimed is:
1. A shaft coupling system that includes:
   a hub with a shaft receiving aperture formed therein, the shaft receiving aperture having an end profile substantially in the shape of a capital letter "D" formed in part by at least three separate major circular arcs and a straight line; wherein
   an end profile of the shaft receiving aperture includes three separate curved areas and a flat area, the three separate curved areas including:

a first curved area defining a major circular arc that comprises over half of a perimeter of the end profile;
a second curved area disposed at a first intersection of the first curved area and the flat area, the second curved area extending outward from an expected intersection of a circle corresponding to the major circular arc and the flat area; and
a third curved area disposed at a second intersection of the first curved area and the flat area, the third curved area extending outward from an expected intersection of a circle corresponding to the major circular arc and the flat area.

2. The system of claim 1, further comprising at least three additional apertures formed through the hub and oriented such that each has an axis that is parallel with an axis of the shaft receiving aperture.

3. The system of claim 1, wherein the at least three additional apertures is four additional apertures.

4. A hobby robotics hub comprising:
a body having therein formed a non-circular shaft receiving aperture having a flat portion and a major circular arc portion such that the non-circular shaft receiving aperture that is substantially in the shape of a capital letter "D";
a shaft securer aperture formed in a substantially flat wall of the body such that the substantially flat wall contributes to the flat portion of the non-circular shaft receiving aperture; and
at least three additional apertures formed in the body and situated such that a center axis of each of the three additional apertures is substantially equidistant from a center axis of the non-circular shaft receiving aperture;
wherein the at least three additional apertures and the shaft securer aperture are coplanar; and
wherein an end profile of the shaft receiving aperture includes three separate curved areas and the flat portion, the three separate curved areas including:
a first curved area defining the major circular arc portion, the first curved area comprising over half of a perimeter of the end profile;
a second curved area disposed at a first intersection of the first curved area and the flat portion, the second curved area extending outward from an expected intersection of a circle corresponding to the major circular arc and the flat portion; and
a third curved area disposed at a second intersection of the first curved area and the flat portion, the third curved area extending outward from an expected intersection of a circle corresponding to the major circular arc and the flat portion.

5. The hub of claim 4, wherein the at least three additional apertures are formed in the body such that they have an end profile situated in a same horizontal plane as an end profile of the non-circular shaft receiving aperture.

6. The hub of claim 4, wherein the shaft securer aperture is configured to receive a fastener that extends through the shaft securer aperture and into the shaft receiving aperture.

7. The hub of claim 4, wherein the at least three additional apertures are four different additional apertures each positioned in a different corner of the body.

8. The hub of claim 4, wherein the shaft receiving aperture is substantially perpendicularly oriented relative to the shaft securer aperture.

9. The hub of claim 4, wherein the shaft securer aperture comprises threads such that a threaded fastener can be received and tightened on a shaft in the non-circular shaft receiving aperture.

10. The hub of claim 4, wherein the shaft receiving aperture extends all the way through the body.

11. The hub of claim 4, wherein the body includes at least six different apertures formed therein.

12. The hub of claim 4, wherein a distance measured from any one of the at least three additional apertures to another one of the three additional apertures is equal so long as not measured at a diagonal passing through the shaft receiving aperture.

13. The hub of claim 4, wherein the body comprises aluminum.

14. A shaft coupling system, comprising:
a hub having a shaft receiving aperture configured to slidably receive a shaft having a flat surface, the hub also including at least three additional apertures situated such that a center axis of each of the three additional apertures is substantially equidistant from a center axis of the shaft receiving aperture; and
wherein the hub comprises an extrusion that extends from a body of the hub, the shaft receiving aperture being disposed through the extrusion, the extrusion having an exterior cross section shape that has multiple lines of symmetry; and
an end profile of the shaft receiving aperture includes three separate curved areas and a flat area, the three separate curved areas including:
a first curved area defining a major circular arc that comprises over half of a perimeter of the end profile;
a second curved area disposed at a first intersection of the first curved area and the flat area, the second curved area extending outward from an expected intersection of a circle corresponding to the major circular arc and the flat area; and
a third curved area disposed at a second intersection of the first curved area and the flat area, the third curved area extending outward from an expected intersection of a circle corresponding to the major circular arc and the flat area.

15. The system of claim 14, wherein an axis of the shaft receiving aperture is in parallel alignment with an axis of each of the at least three additional apertures.

16. The system of claim 14, wherein the at least three additional apertures is four additional apertures.

17. The system of claim 14, wherein the shaft receiving aperture formed in the hub is formed so as to be in substantially the shape of a capital letter "D".

* * * * *